(12) United States Patent
Lucas et al.

(10) Patent No.: US 7,823,863 B2
(45) Date of Patent: Nov. 2, 2010

(54) SPARE TIRE HOIST SYSTEM WITH COMPOSITE WHEEL PLATE HAVING SPRING RECESS

(75) Inventors: Jeremy Lucas, Delaware, OH (US); Christopher Dendis, Plain City, OH (US); James H. Nazarian, Jr., Marysville, OH (US); Robb Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 173 days.

(21) Appl. No.: 12/062,555

(22) Filed: Apr. 4, 2008

(65) Prior Publication Data
US 2009/0250493 A1   Oct. 8, 2009

(51) Int. Cl.
*B66D 1/00* (2006.01)

(52) U.S. Cl. ............... 254/323; 414/463; 414/464; 414/465; 414/466; 224/42.12; 224/42.23

(58) Field of Classification Search ......... 254/323; 414/463–466; 224/42.12, 42.23
See application file for complete search history.

(56) References Cited

U.S. PATENT DOCUMENTS

| | | | | | |
|---|---|---|---|---|---|
| 3,649,079 | A | * | 3/1972 | English | 301/35.631 |
| 3,724,731 | A | * | 4/1973 | Potgieter et al. | 224/42.23 |
| 3,777,575 | A | * | 12/1973 | Smithmeyer | 73/483 |
| 4,684,310 | A | * | 8/1987 | Stange | 414/427 |
| 5,408,854 | A | * | 4/1995 | Chiu | 70/225 |
| 5,797,190 | A | * | 8/1998 | Matson | 33/203.18 |
| 5,921,449 | A | * | 7/1999 | Saegusa et al. | 224/42.2 |
| 6,033,003 | A | * | 3/2000 | Bell et al. | 296/37.3 |
| 6,427,981 | B1 | | 8/2002 | Kingsbury et al. | |
| 6,499,724 | B1 | | 12/2002 | Dobmeier et al. | |
| 6,527,252 | B2 | | 3/2003 | Dziedzic | |
| 6,682,293 | B2 | | 1/2004 | Dziedzic et al. | |
| 7,028,989 | B2 | | 4/2006 | Flynn et al. | |
| 7,287,819 | B2 | * | 10/2007 | McNeil | 301/35.629 |
| 2001/0051089 | A1 | * | 12/2001 | Morin et al. | 414/463 |
| 2007/0241144 | A1 | * | 10/2007 | Rock et al. | 224/42.23 |

* cited by examiner

*Primary Examiner*—Emmanuel M Marcelo
(74) *Attorney, Agent, or Firm*—Mark E. Duell, Esq.; Emerson Thomson Bennett

(57) ABSTRACT

A spare tire hoist may be provided. A retention cable may be used to retain a spare tire against a surface of a motor vehicle. A tensioning spring may be used to tension the retention cable when the spare tire is in a storage position. A wheel plate engages the spare tire and cooperates with the retention cable and the tensioning spring to maintain the spare tire in the storage position. The wheel plate may include an insert portion that engages a center aperture of a wheel rim of the spare tire. A flange portion that substantially surrounds the insert portion and engages a peripheral surface of the wheel rim may also be provided. A reinforcement ring may be included in the wheel plate, substantially coextensive with the insert portion and extending within a substantially hollow region of the flange portion. The reinforcement ring may provide mechanical reinforcement to the wheel plate.

20 Claims, 3 Drawing Sheets

SPARE TIRE HOIST SYSTEM WITH COMPOSITE WHEEL PLATE HAVING SPRING RECESS

I. BACKGROUND OF THE INVENTION

A. Field of Invention

Figure 1:
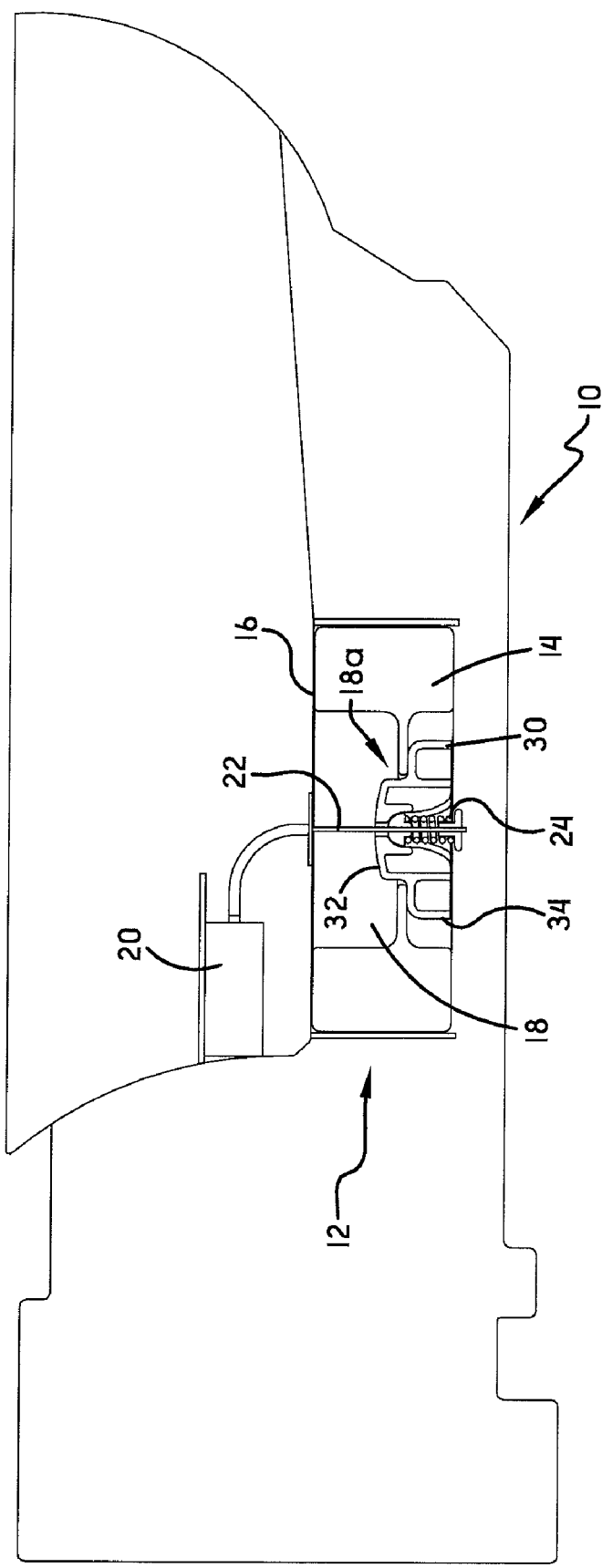

This invention generally relates to the art of methods and apparatuses regarding equipment used to retain spare tires for use with a motor vehicle, and more particularly to methods and apparatuses regarding wheel plates for use in removably supporting a spare tire on the underside of a motor vehicle.

B. Description of the Related Art

As is known by those of skill in the art, spare tires can be mounted to the underside of a vehicle with a tire carrier that uses a cable to raise and lower the tire from a storage position. A wheel plate is generally used to engage the wheel hub and thereby support the spare tire while in the storage position. Typically, wheel plates are made of steel which is prone to failure due to corrosion. Other types of wheel plates are made of composite materials which are corrosion resistant and therefore are not prone to this type of failure.

Certain composite material wheel plates have been found to crack when impacted from below, such as while driving off a high curb. This type of failure is caused by a cable tension spring contacting the ground or curb and thereby driving a point load into the composite wheel plate, resulting in a fracture.

Accordingly, there is a need for a wheel plate formed of composite materials that has greater impact resistance and is not prone to fracture failures resulting from underside impacts to the cable tension spring.

II. SUMMARY OF THE INVENTION

Some embodiments of the present invention relate to a wheel plate for a spare tire hoist. An insert portion may be provided that engages a center aperture of a wheel rim for a spare tire. A flange portion may substantially surround the insert portion and engage a peripheral surface of the wheel rim. A reinforcement ring may be formed within the flange portion and provide mechanical reinforcement to the wheel plate.

Other embodiments of the invention relate to a spare tire hoist. A retention cable may be provided that retains a spare tire against a surface of a motor vehicle. A tensioning spring may be used to tension the retention cable when the spare tire is in a storage position. A wheel plate may be used to engage the spare tire and cooperate with the retention cable and the tensioning spring to maintain the spare tire in the storage position. The wheel plate may include an insert portion that engages a center aperture of a wheel rim of the spare tire. A flange portion that substantially surrounds the insert portion and engages a peripheral surface of the wheel rim may also be provided. A reinforcement ring may be included in the wheel plate, substantially coextensive with the insert portion and extending within a substantially hollow region of the flange portion. The reinforcement ring provides mechanical reinforcement to the wheel plate.

Still other embodiments of the invention relate to a wheel plate for a spare tire hoist. Means are provided for engaging a center aperture of a wheel rim for a spare tire. Other means are used for substantially surrounding the insert portion and engaging a peripheral surface of the wheel rim. Additional means provide mechanical reinforcement to the wheel plate, formed within the flange portion.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a side view generally indicating a spare tire hoist system mounted to an underside of a motor vehicle, in accordance with one embodiment of the present invention.

Figure 2A:
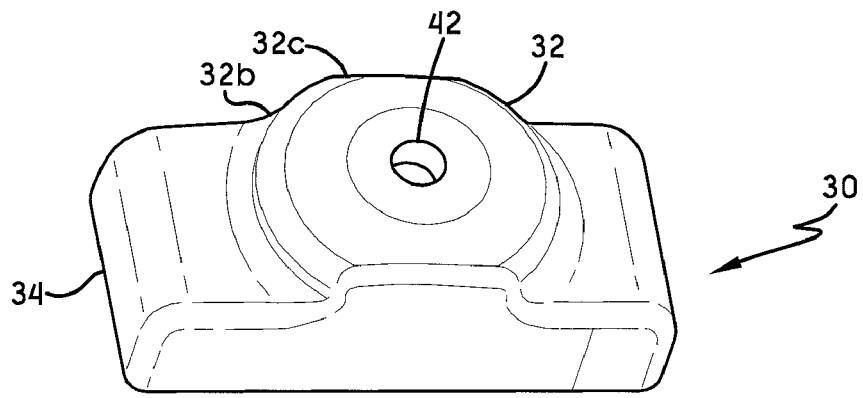
Figure 2B:
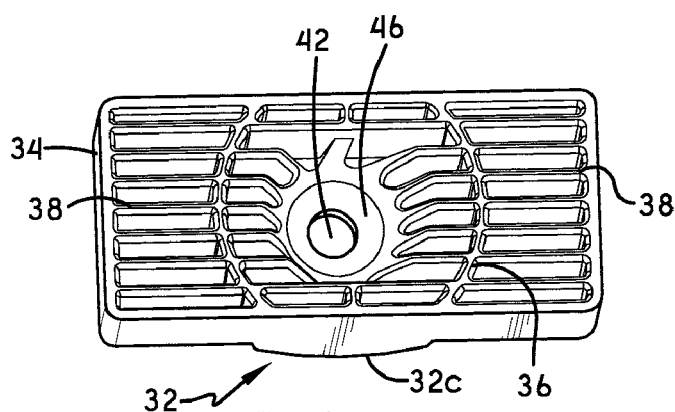
Figure 2C:
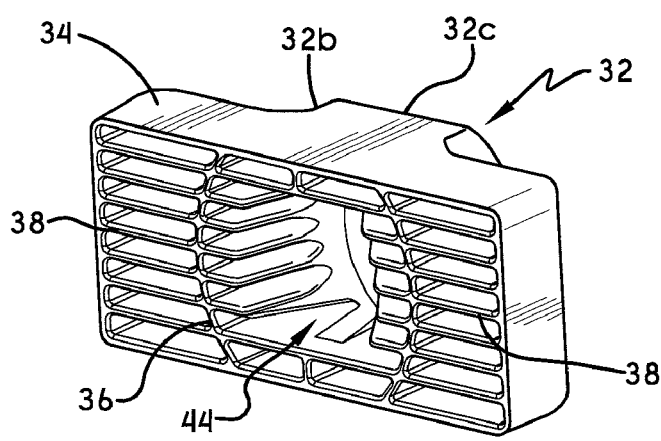

FIGS. 2A, 2B, and 2C are respective top perspective, bottom perspective and oblique perspective views illustrating a wheel plate in accordance with one embodiment of the present invention.

Figure 3:
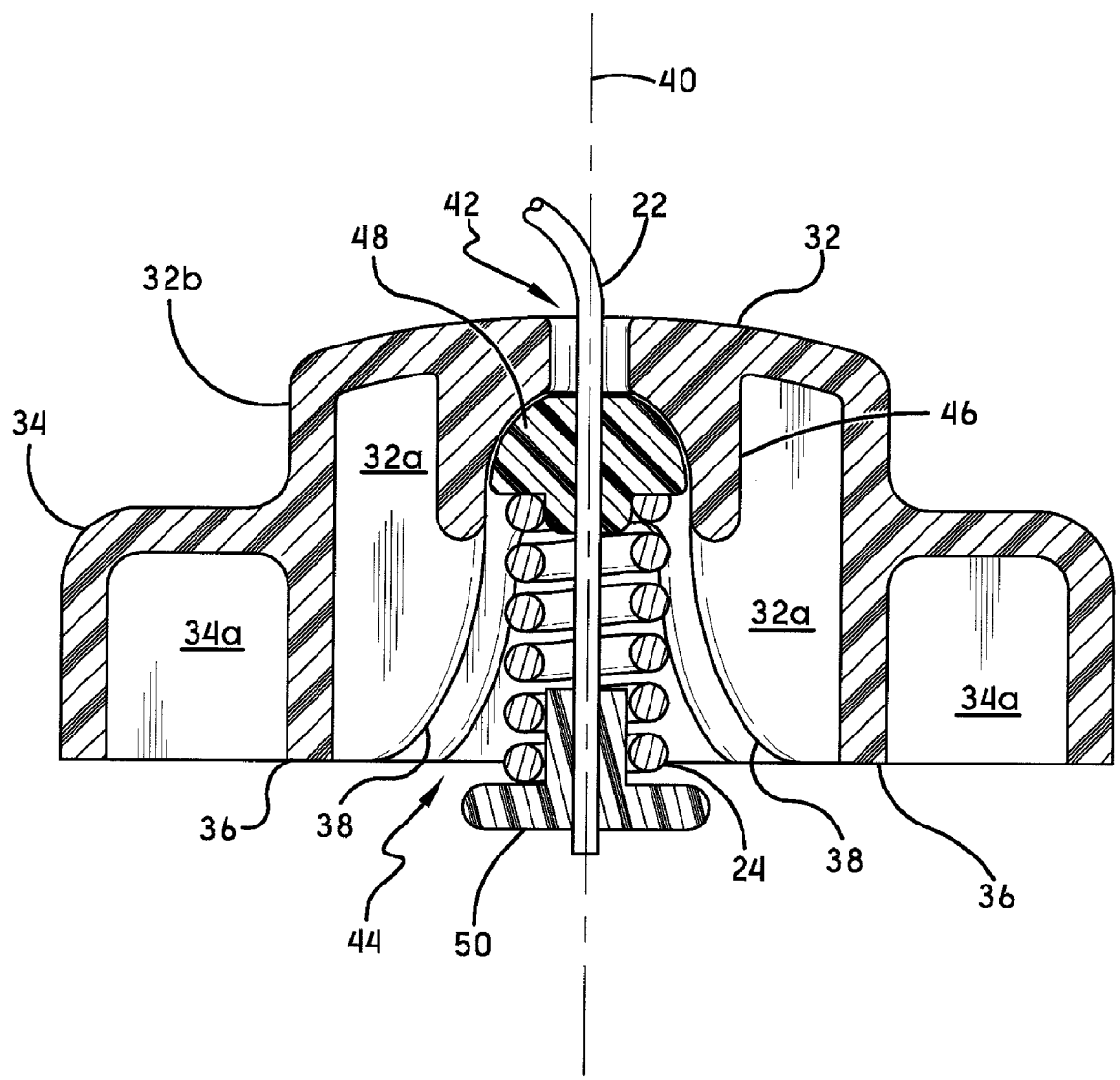

FIG. 3 is a side-sectional view showing the wheel plate in accordance with one embodiment of the present invention.

IV. DETAILED DESCRIPTION OF THE INVENTION

The present invention generally relates to a spare tire hoist system including a wheel plate designed to withstand impacts without fracturing. The wheel plate may be formed of a composite material, and may be substantially hollow. An insert portion may be inserted into a central aperture in a wheel rim and a flange portion may engage a peripheral portion of the wheel rim around the central aperture. A reinforcement ring may be formed within a hollow region of the flange portion and may provide mechanical strength thereto. A plurality of reinforcing ribs may also be formed within the hollow region of the flange portion. A spring recess may be used to retain a tensioning spring so that it does not protrude and sustain damaging impacts.

With reference now to the drawings wherein the showings are for purposes of illustrating embodiments of the invention only and not for purposes of limiting the same, and wherein like reference numerals are understood to refer to like components. FIG. 1 illustrates a section of a motor vehicle 10 including a spare tire hoist system 12 mounted to the underside of the vehicle 10, for retaining a spare tire 14 so as to be accessible from the exterior of the vehicle 10 in the event of a flat tire that requires roadside changing, as is understood in the art.

With continuing reference to FIG. 1, the spare tire hoist system 12 may include a spool 20 for retracting and extending a retractable retention cable 22. The spool 20 may be a common type device such as is used with such systems that can be selectively actuated by a motorist or service personnel in the event that the spare tire 14 must be removed from the vehicle 10. The spool 20 thereby allows for retracting and extending of the retention cable 22 so as to move the spare tire between a storage position and a release position.

Still referring to FIG. 1, it should be appreciated that in the storage position, the cable 22 is tensioned so as to securely maintain the spare tire 14 in suitable engagement against an underside surface 16 of the vehicle 10. In the release position, the cable is extended so as to release the spare tire 14 from engagement with the vehicle 10 and lower the spare tire 14 so that it can be removed and used as a replacement for the flat tire.

With continuing reference to FIG. 1, the spare tire hoist system 12 also includes a tensioning spring 24 that tensions the retention cable when the spare tire 14 is in a storage position. A wheel plate 30 engages the spare tire 14 and cooperates with the retention cable 22 and the tensioning spring 24 to maintain the spare tire 14 in the storage position.

As generally indicated in FIG. 1 and shown in greater detail in FIGS. 2A and 3, the wheel plate 30 includes an insert portion 32 that engages a center aperture 18a of a wheel rim 18 of the spare tire 14. The wheel plate 30 also includes a flange portion 34 that substantially surrounds the insert portion 32 and engages a peripheral surface of the wheel rim 18, where the peripheral surface surrounds the central aperture 18a and essentially defines the boundary thereof.

As shown particularly in FIGS. 2B and 2C and generally indicated in FIG. 3, the wheel plate 30 includes a reinforcement ring 36, formed within the flange portion 34, and provides mechanical reinforcement to the wheel plate 30. In one embodiment, as depicted in the FIGURES, the insert portion 32 and the flange portion 34 are substantially hollow, so that the insert portion 32 has an insert portion hollow region 32a and the flange portion 34 also has flange portion hollow region 34a.

With reference now to all the FIGURES, the reinforcement ring 36 may extend within the flange portion hollow region 34a. In one embodiment, shown particularly in the side-sectional view of FIG. 3, the reinforcement ring 36 is substantially coextensive with the insert portion 32, so that the walls of the insert portion 32 are substantially continuous with the reinforcement ring 36 so as to define the boundary between the insert portion hollow region 32a and the flange portion hollow region 34a.

With continuing reference to all the FIGURES, the flange portion hollow region 34a may include a plurality of reinforcing ribs 38. These ribs 38 may be substantially parallel and extend through the reinforcing ring 36 and into the insert portion hollow region 32a, where they become tapered (as will be described in greater detail hereinbelow.) Forming these reinforcing ribs 38 into the hollow regions 32a, 34a reduces the overall rigidity of the wheel plate 30 since the ribs allow localized flexing when point loads are applied to various locations. By flexing, rigidity is reduced thereby dissipating the point loads rather than causing fracturing as would occur with a solid body as in previous type composite wheel plates.

Still referring to all the FIGURES, the insert portion 32 may have a substantially circular peripheral region 32b, radially centered along a central axis 40. As illustrated, the peripheral region 32b may be substantially circular but have truncated sides 32c, so as provide a continuously flush surface with the sides of the flange portion 34. The reinforcement ring 36 may also be substantially circular and substantially coextensive with the peripheral region 32b of the insert portion 32. The reinforcement ring 36 may thus also be radially centered along the central axis 40, and may have a radius substantially the same as that of the peripheral region 32b.

With continuing reference to all the FIGURES, the insert portion 32 of the wheel plate 30 may also include an axial aperture 42, formed along the central axis 40 of the insert portion 32. The axial aperture 42 may define a passage that admits the retention cable 22 and thereby allows for retaining the wheel plate 30 against the spare tire 14.

The insert portion 32 may also include a spring recess 44 that supports the tensioning spring 24 for tensioning the retention cable 22. The spring recess 44 may be a generally tapered cavity defined by the portions of the reinforcing ribs 38 that extend through the reinforcing ring 36 and into the insert portion hollow region 32a, where they become tapered, as shown especially in FIG. 2C. The spring recess 44 may therefore be substantially frustoconical in shape.

Still referring to all the FIGURES, the spring recess 44 may also include a seat member 46, that may be hemispherical in shape, and that may be formed to have a solid, continuous surface with the terminal ends of the tapered portions of the reinforcing ribs 38 within the reinforcing ring 38, as particularly shown in FIGS. 2B and 3. A spring swivel 48 may be retained in the seat member 46 within the spring recess 44. The spring swivel 48 may be used for swivelably engaging an anterior end of the tensioning spring 24. In other words, the spring swivel 48 may provide free movement to tilt and rotate within the seat member 46 as the spare tire 14 is raised and lowered, so that the wheel plate 30 will not twist or hang up, thereby not placing additional loads on the cable 22 that would stress the cable 22 or be transmitted to the wheel plate 30.

A cable crimp 50 may be provided at the terminal end of the retention cable 22. As shown particularly in FIG. 3, the cable crimp 50 may have a "T-shape" sectional area for engaging and supporting a posterior end of the tensioning spring 24, opposite to the anterior end that engages the spring swivel 48. In this manner, the spring 24 may be tensioned between the spring swivel 48 and the cable crimp 50 so that when the cable 22 is fully retracted, the spring 24 is compressed, thereby applying a spring force to the wheel plate 30 and thereby to the spare tire 14. In this way, the spare tire 14 is held securely in place by the tension of the cable and the compression of the spring 24.

With continuing reference to all the FIGURES, upon compression by the cable 22, the spring 24 may be substantially retained within the spring recess 44 so that it does not significantly protrude below the bottom of the wheel plate 30. In this way, the spring 24 does not significantly extend below the underside plane of the spare tire 14 and is therefore not exposed to curbs or other contact surfaces that may otherwise strike the spring 22 and thereby place impact loads on the wheel plate 30.

Still referring to all the FIGURES, the wheel plate 30 may be formed of a composite material. The composite material may be of any suitable type that can be molded or formed to include the features described hereinabove. The composite material can therefore be of any type having a matrix component and a reinforcement component. For example, the composite material can include a matrix of carbon fiber filaments or other suitable types of polymer matrix materials. The reinforcement can include a resin or other suitable organic component, or can include a metal or mineral component as a matrix or reinforcement, such as fiberglass. Similarly, a metal matrix composite can be employed in which metal fibers are used with metal reinforcement. Indeed, any suitable type of composite material can be selected on the basis of the performance requirements of a wheel plate in accordance with the present invention, as would be understood and appreciated in the art.

Numerous embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

1. A wheel plate for a spare tire hoist comprising:
    an insert portion that engages a center aperture of a wheel rim for a spare tire, wherein at least a portion of the insert portion extends through the center aperture of the wheel rim;

a flange portion that substantially surrounds the insert portion and engages a peripheral surface of the wheel rim; and a reinforcement ring, formed within the flange portion, that provides mechanical reinforcement to the wheel plate.

2. The wheel plate of claim 1, wherein the insert portion and flange portion are substantially hollow and wherein the reinforcement ring extends within a hollow region of the flange portion.

3. The wheel plate of claim 2, wherein the reinforcement ring is substantially coextensive with the insert portion.

4. The wheel plate of claim 2, wherein the hollow region of the flange portion further comprises a plurality of reinforcing ribs.

5. The wheel plate of claim 1, wherein the insert portion has a substantially circular peripheral region, radially centered along a central axis.

6. The wheel plate of claim 5, wherein the reinforcement ring is substantially circular and substantially coextensive with the peripheral region of the insert portion, and radially centered along the central axis.

7. The wheel plate of claim 5, wherein the insert portion further comprises an axial aperture, formed along the central axis of the insert portion, that admits a retention cable for retaining the wheel plate against the spare tire.

8. The wheel plate of claim 7, wherein the insert portion further comprises a spring recess that supports a tensioning spring for tensioning the retention cable.

9. The wheel plate of claim 8, wherein the spring recess is substantially frustoconical in shape.

10. The wheel plate of claim 5, further comprising:
a spring swivel, retained in a seat member within the spring recess, for swivelably engaging an anterior end of the tensioning spring; and
a cable crimp for engaging a posterior end of the tensioning spring, wherein the spring is tensioned between the spring swivel and the cable crimp.

11. The wheel plate of claim 5, wherein the wheel plate is formed of a composite material.

12. A spare tire hoist system comprising:
a retention cable that retains a spare tire against a surface of a motor vehicle;
a tensioning spring that tensions the retention cable when the spare tire is in a storage position; and,
a wheel plate that engages the spare tire and cooperates with the retention cable and the tensioning spring to maintain the spare tire in the storage position, the wheel plate further comprising:
an insert portion that engages a center aperture of a wheel rim of the spare tire wherein at least a portion of the insert portion extends through the center aperture of the wheel rim;
a flange portion that substantially surrounds the insert portion and engages a peripheral surface of the wheel rim; and,
a reinforcement ring, substantially coextensive with the insert portion and extending within a substantially hollow region of the flange portion, wherein the reinforcement ring provides mechanical reinforcement to the wheel plate.

13. The spare tire hoist system of claim 12, wherein:
the tensioning cable comprises a retractable cable; and,
wherein the spare tire hoist further comprises a spool for retracting and extending the cable so as to move the spare tire between a storage position and a release position.

14. The spare tire hoist system of claim 12, wherein the hollow region of the flange portion further comprises:
a plurality of reinforcing ribs.

15. The spare tire hoist system of claim 12, wherein:
the insert portion has a substantially circular peripheral region, radially centered along a central axis; and,
the reinforcement ring is substantially circular and substantially coextensive with the peripheral region of the insert portion, and radially centered along the central axis.

16. The spare tire hoist system of claim 12, wherein the insert portion further comprises:
an axial aperture, formed along a central axis of the insert portion, that admits the retention cable for retaining the wheel plate.

17. The spare tire hoist system of claim 12, wherein the insert portion further comprises:
a spring recess that supports the tensioning spring for tensioning the retention cable.

18. The spare tire hoist system of claim 12, further comprising:
a spring swivel, retained in a seat member within the spring recess, for swivelably engaging an anterior end of the tensioning spring; and
a cable crimp for engaging a posterior end of the tensioning spring, wherein the spring is tensioned between the spring swivel and the cable crimp.

19. The spare tire hoist system of claim 12, wherein the wheel plate is formed of a composite material.

20. A spare tire hoist system comprising:
a retention cable that retains a spare tire against a surface of a motor vehicle;
a tensioning spring that tensions the retention cable when the spare tire is in a storage position; and,
a one-piece wheel plate that engages the spare tire and cooperates with the retention cable and the tensioning spring to maintain the spare tire in the storage position, the one-piece wheel plate further comprising:
an insert portion that engages a center aperture of a wheel rim of the spare tire, wherein at least a portion of the insert portion extends through the center aperture of the wheel rim;
a flange portion that partially surrounds the insert portion and engages a peripheral surface of the wheel rim; and
a reinforcement ring formed within the flange portion, wherein the reinforcement ring provides mechanical reinforcement to the wheel plate.

* * * * *